UNITED STATES PATENT OFFICE.

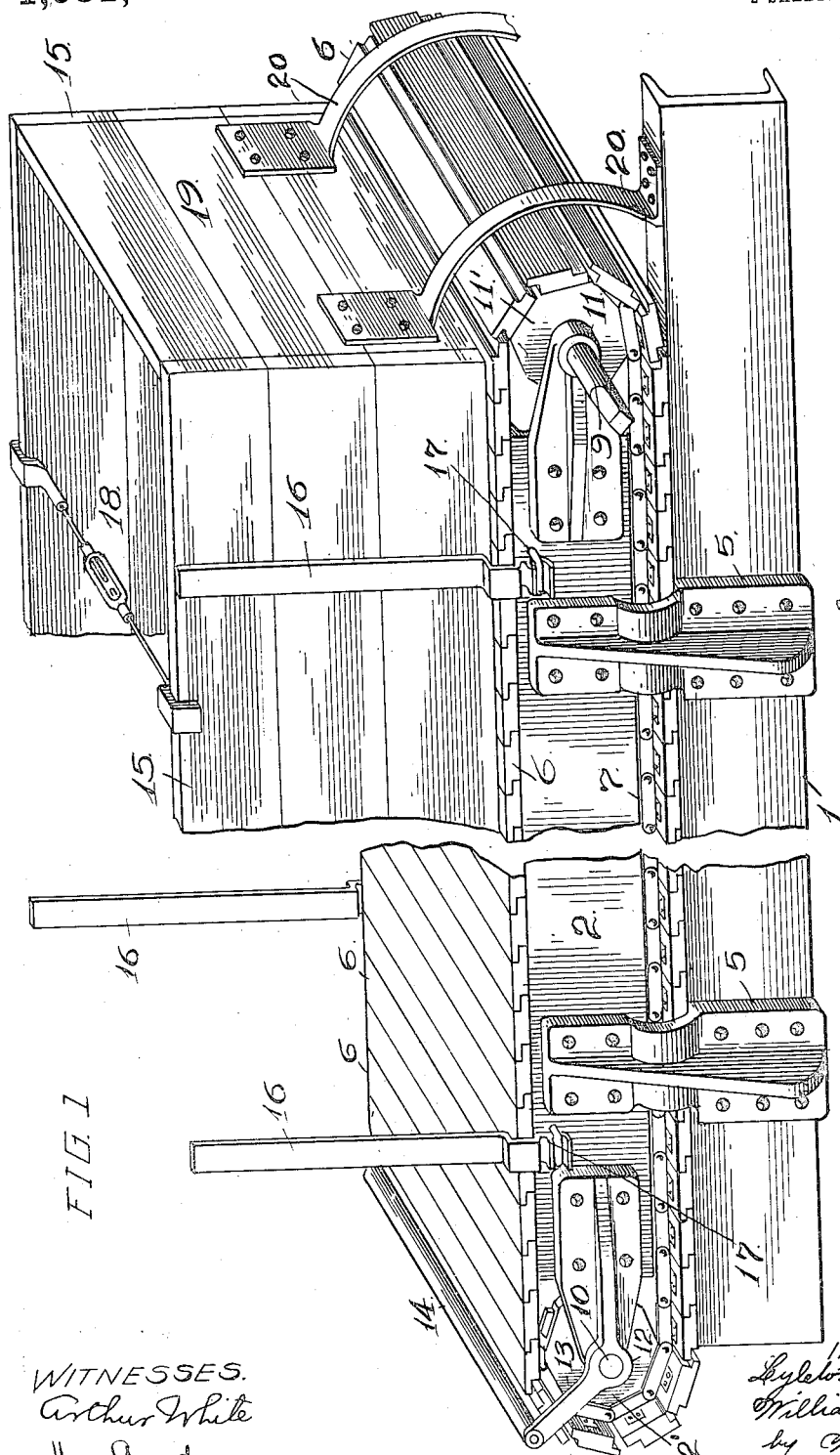

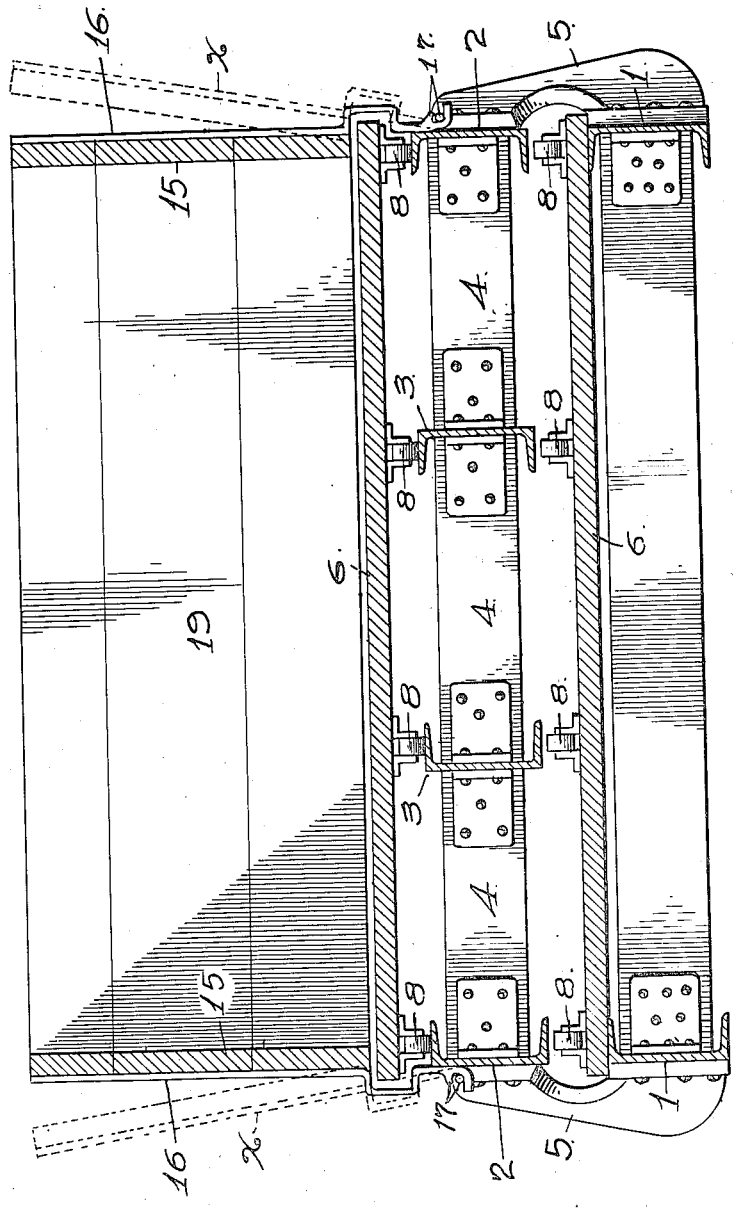

LYLETON E. RENNEY AND WILLIAM J. PEDLER, OF SAN-FRANCISCO, CALIFORNIA.

LOADING AND DUMPING DEVICE.

1,081,697.

Specification of Letters Patent.    Patented Dec. 16, 1913.

Application filed September 23, 1912. Serial No. 721,921.

*To all whom it may concern:*

Be it known that we, LYLETON E. RENNEY and WILLIAM J. PEDLER, citizens of the United States, residing in the city and county of San Francisco, State of California, have invented certain new and useful Improvements in Loading and Dumping Devices, of which the following is a specification.

Our invention relates to loading and dumping devices, adapted to be attached to the bed of any common carrier, more particularly a motor truck, and by its operation simplifies the handling of the load in the manner desired. The device itself takes the place of, and constitutes the load carrying platform of the vehicle or common carrier to which it is attached.

It is a well known fact that more time and labor are required to properly place heavy merchandise or material on the bed of a truck, or car platform, in proper load formation than is required to bring the goods to the side of the same for loading. For example, in the loading of blocks of stone or heavy castings, machinery and the like, it is necessary to pinch, or roll them in proper load formations after they have been lifted to the bed of the truck, or common carrier. This process is expensive in both time and labor. The process of unloading all or a part of the load means the same loss of time and labor as the loading, and not only this, the merchandise is often damaged through rough handling, thus entailing additional loss on either the owners or transporters of the freight.

The object of our invention is to overcome the above objectionable features by a simple and comparatively inexpensive device which may be attached to the frame, or bed of any truck or common carrier.

For a clear comprehension of the construction and operation of our invention, reference should be had to the accompanying drawings in which:—

Figure 1, is a side elevation in perspective of the device secured to the vehicle frame. The center is broken open to indicate the indeterminate length of the movable load platform. The sides are broken away showing the surface of the same. Fig. 2, is a cross-section of the same showing the relative position of the roller supports in the links of the sprocket chains connecting the flexible flooring of the load platform. This view also shows the center or auxiliary members for strengthening the center of the movable platform, and a means for securing the device to the frame of a motor truck, or common carrier.

The numeral 1 is used to designate the frame of a motor driven truck, or common carrier of any suitable type for the transportation of heavy merchandise or material.

2 is the frame on which the mechanism is mounted.

3, 3, are the central supporting members with the cross ties 4, 4.

5, 5, are the brackets by which the device is secured to the frame of the truck, or common carrier.

6, 6, are overlapping planks or cleats, corrugated or plain, which are flexibly connected by means of the sprocket chain 7, each link of which is provided with the roller or anti-friction wheel 8. The sprocket shafts 9 and 10 are mounted in suitable bearings 11 and 12. These shafts are provided with the sprockets 11' and 12'. The ends of said sprocket shafts are squared for applying the power to operate the device. The rear bearings 12 are provided with the extension arms 13, the ends of which form a bearing in which the guard roller 14 is mounted.

15, 15 are the detachable movable sides, with the supporting stanchions 16, 16, in the lower end of which are the hooked bearings 17, 17. The dotted lines X—X (Fig. 2), show the relative position of the sides when released to facilitate the operation of unloading.

18 is a turnbuckle and rod for securing the sides in position to protect and carry the load.

19 is the front end gate with its supporting brackets 20, 20.

The operation of our device is as follows: The motor truck, or common carrier, with our device attached is brought to the loading platform of a car or warehouse, and the merchandise or material is hoisted onto the platform of the motor truck in the ordinary manner. When placed in load position on the tail of the truck, the operator applies power to either of the sprocket shafts, rotating the same, and, by this means, causes the endless flexible load platform to move forward a suitable distance, carrying the articles of merchandise, or material with it. This movement brings into place at the tail of the truck room for the next articles to be loaded. As soon as they are in place the operation is repeated, and so on until the first articles of merchandise, or material, loaded have reached the front end gate, thus filling the bed and constituting a load. To unload the vehicle, the above operation is reversed, and by this means either the entire load may be dumped, or any part thereof. To prevent unnecessary friction by reason of the sides coming in contact with the load during the movement thereof the detachable movable stanchions are provided. By this means the sides are released (indicated by dotted lines X—X Fig. 2), or removed entirely during the process of loading or unloading a motor truck, or common carrier, equipped with our device.

It will be readily seen that our invention is a practical labor and time saving device.

We do not wish to be understood as confining ourselves to the precise construction shown herein, but wish to avail ourselves of any modifications that may properly fall within the scope of our invention.

Having described our invention, what we claim and desire to secure by Letters Patent is:—

1. In combination in a motor truck comprising a frame composed of beams disposed longitudinally of the vehicle and joined together by transverse members, a secondary supporting frame similarly constructed of longitudinal and transverse members, said secondary frame being suitably elevated from said vehicle frame and supported therefrom by side brackets, a flexible endless carrier adapted to pass over and around the secondary frame to form a movable load platform for the vehicle, detachable side boards supported on said supporting frame, a permanent front end gate supported from the vehicle frame by arc-shaped brackets, and a guard roller supported by a bracket from the rear end of the supporting frame, said roller being disposed in alinement with the upper floor level of the vehicle, substantially as described.

2. In combination in a motor truck, a suitable frame, a flexible endless carrier, and a guard roller 14 arranged at one end of the truck in proximity to the surface of the carrier as it travels around its support.

3. In combination in a motor truck comprising a frame, an endless carrier, a front end portion, and arc-shaped brackets supporting the same from the frame and permitting free, uninterrupted movement of the endless carrier, substantially as described.

In testimony whereof we affix our signatures in presence of two witnesses.

LYLETON E. RENNEY.
WILLIAM J. PEDLER.

Witnesses:
HORTENSE GARDNER,
JNO. C. W. BRAAD.